Figure 1:
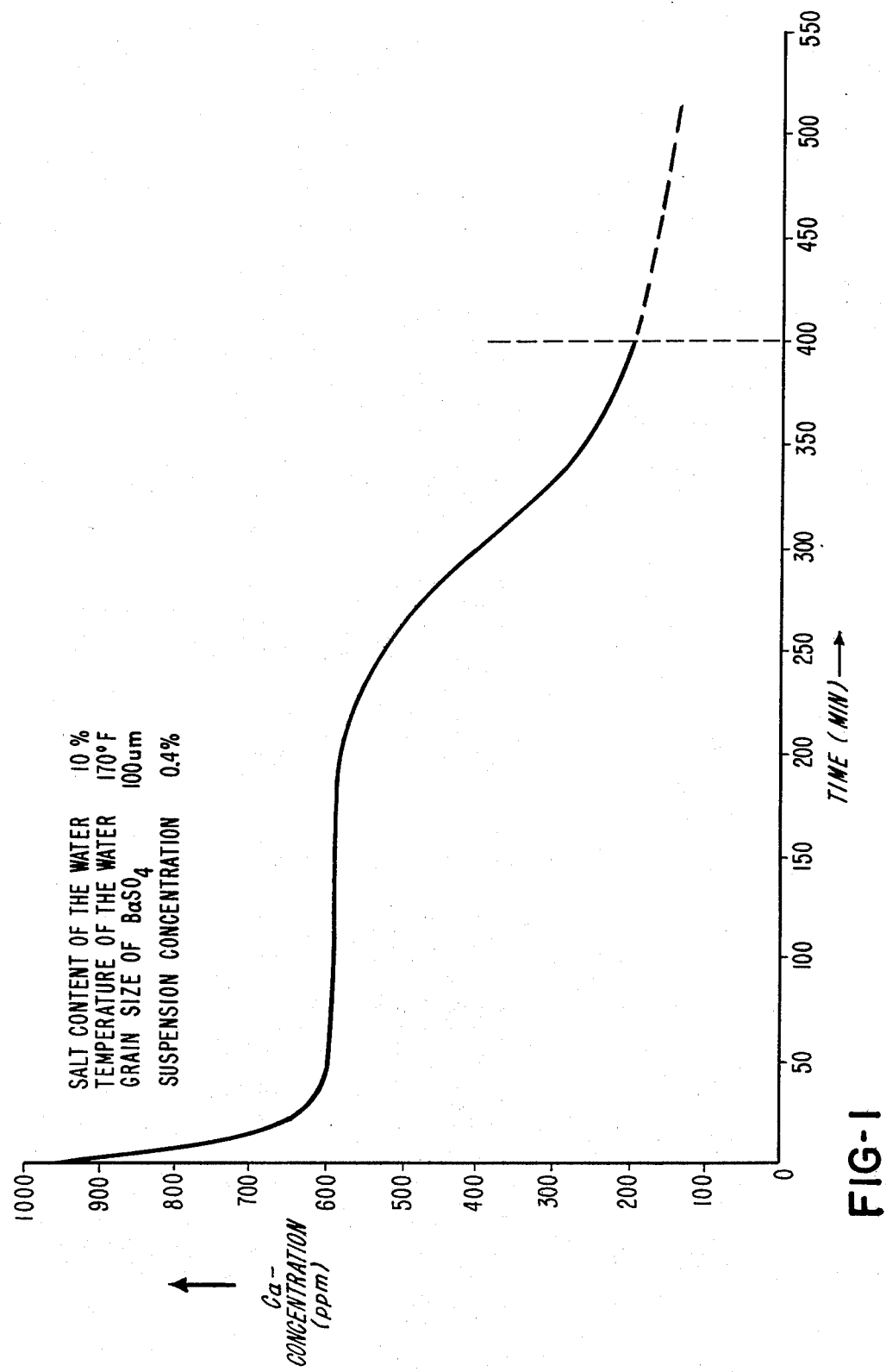

United States Patent [19]
Fröhner et al.

[11] 3,974,039
[45] Aug. 10, 1976

[54] ADDITION OF FINELY DIVIDED BaSO₄ PARTICLES TO SEA WATER FOR REMOVAL OF SCALE COMPONENTS

[75] Inventors: Klaus Fröhner; Hossein Panahandeh, both of Geesthacht, Germany

[73] Assignee: Gesellschaft fur Kernenergieverwertung in Schiffbau und Schiffahrt mbH, Geesthacht-Tesperhude, Germany

[22] Filed: Nov. 4, 1974

[21] Appl. No.: 520,841

[30] Foreign Application Priority Data
Nov. 2, 1973 Germany............................ 2354727
May 28, 1974 Germany............................ 2425670

[52] U.S. Cl. ................................... 203/7; 23/301; 23/304; 159/DIG. 13; 210/57; 252/81; 252/178; 203/11; 203/DIG. 17
[51] Int. Cl.² ..................... B01D 3/34; C23F 11/00; C23F 14/00
[58] Field of Search.......... 159/DIG. 13; 23/272 AH, 23/300, 301 R, 304; 203/DIG. 17, 7, 6, 11; 210/57; 252/80, 81, 86, 175, 178

[56] References Cited
UNITED STATES PATENTS

| | | | |
|---|---|---|---|
| 896,272 | 8/1908 | Camors | 252/175 |
| 2,204,522 | 6/1940 | Werner et al. | 210/57 |
| 2,429,594 | 10/1947 | Case | 252/175 |
| 3,525,675 | 8/1970 | Gaudin | 252/80 |
| 3,655,582 | 4/1972 | Dupre et al. | 252/175 |
| 3,725,268 | 4/1973 | Gelblum | 203/7 |

*Primary Examiner*—Norman Yudkoff
*Assistant Examiner*—Frank Sever
*Attorney, Agent, or Firm*—Walter Becker

[57] ABSTRACT

A process of reclaiming drinking and industrial water from sea water, according to which the sea water to be processed is subjected to a pretreatment, comprising filtering, acidifying and degassing said sea water. To the thus treated sea water there is then added in suspension finely divided barium sulphate to provide nuclei for the crystal growth of calcium sulphate on the barium sulphate. The thus obtained suspension is then in a continuous process heated and partly evaporated, during which process, temperatures of supersaturation, with respect to calcium sulphate are reached, the water which is evaporated being collected as condensate and distillate.

18 Claims, 2 Drawing Figures

ADDITION OF FINELY DIVIDED BASO₄ PARTICLES TO SEA WATER FOR REMOVAL OF SCALE COMPONENTS

The invention relates to a method of softening the hardness from sea water and sea water brine during the heating process in a sea water evaporator by adding thereto insoluble sulphate salts which function as seeds for crystallizing out the calcium sulphate contained in the sea water. A suitable sulphate salt which is insoluble at the temperature that may be reached in any thermal desalination process of sea water, and which provides nuclei for the growth of calcium sulphate, is added in the form of a suspension to the sea water from which potable water is to be processed.

The invention also concerns a process for the reclamation of drinking and industrial water from salt water by the simultaneous employment of the sulphate softening process.

In view of the rising demand for fresh water and industrial water not only in the arid zones of developing countries, but also in the industrial growth centers of industrialized nations, more and more importance attaches to processes for the reclamation of fresh water from sea water. The temperature increase which for thermodynamic reasons it is desirable to increase the maximum process temperature in the thermal processes of fresh water reclamation as high as possible but this is limited by the hard deposits of calcium sulphate which form on the hot surfaces of heat exchangers and brine heaters. The solubility of the calcium sulphate contained in sea water has a negative temperature coefficient, so that it is precipitated in crystalline form and gives rise to these incrustations when the temperature is raised beyond a critical limit. Heating surfaces coated with such incrustations cause a material decline in efficiency of the plant. The deposits are very difficult to remove either mechanically or by chemical means, so that the plant gradually deteriorates.

Various methods of removing or neutralizing the sulphate hardness from sea water and of neutralizing the same have been described in the literature. One such method — usually referred to as the "seeding" method — consists in adding finely divided calcium sulphate to the sea water as an inoculant which causes the crystals, when the solubility limit (near a heating surface) has been reached, preferentially to grow on these nuclei rather than on the heating surface which is thus kept free of deposits. However, this method has the drawback that the calcium sulphates used for seeding are relatively easily soluble in sea water between 0° and 80°C and that the required suspension of seed crystals must therefore be prepared and kept available in suitably designed apparatus at elevated temperature, possibly under pressure. This is not very safe because any cooling of the brine containing the seed crystals will result in the latter dissolving in the following parts of the sea water desalination plant or during unintentional stoppages. The relatively expensive finely divided calcium sulphate will then be wasted without having served its purpose.

It is, therefore, an object of the present invention to improve the contemplated process of demineralization in such a way that no difficulties are experienced in introducing the seeds into the process and that they can be just as easily removed from the process when the calcium sulphate has accumulated and grown on the seeds.

According to the invention this is achieved by adding a finely divided barium sulphate to the sea water or brine that is to be processed. The resultant mixture during the evaporization process is heated to supersaturation temperature — assuming the mixture was not already in this state at the beginning —, and after the calcium sulphate has grown on the seed, it is reseparated into solids and solution by filters, hydrocyclones or the like. The calcium sulphate can be removed from the seeds by cooling, washing and like methods and the recovered seeds can be reintroduced into the process.

The proposed process may also be performed without the recovery and recycling of the seeding suspension by continuously preparing a fresh nucleating suspension and introducing this into the process, the suspension when charged with calcium sulphate being simply treated as waste. Both alternatives can be applied to the large scale thermal desalination of sea water.

In order to practice the process, a sulphate suitable for seeding, namely a practically insoluble and relatively cheap barium sulphate, $BaSO_4$, having a grain size of between 50 and 100 microns is suspended in cold water or sea water by stirring and is then metered into the sea water or brine that is to be processed by means of a simple gating device or a metering pump.

Tests have confirmed that the number of calcium ions in supersaturated calcium sulphate solutions is, as illustrated in FIG. 1, reduced in the course of a few hours in the presence of a barium sulphate which has been introduced in suspension. More specifically, the time $t$ in minutes is plotted over the abscissa, whereas the calcium concentration is plotted over the ordinate. The rate at which the calcium concentration diminishes was measured over a period of 400 minutes. The processing temperature for the test was $t = 170°F$, equivalent to 76.7°C. The measurements were plotted and the curve showed that the calcium concentration fell considerably during the first thirty minutes. Another considerable drop then occured after the 250th minute. An analysis of the barium sulphate crystals after the tests revealed that these contained a proportion of calcium. This had probably grown on the surface of the barium sulphate crystals as calcium sulphate with or without water of crystallization.

According to the invention, the described process of reclamation of drinking water can also be performed with other salts or chemical compounds which in the temperature interval concerned are sparingly soluble but which have a crystal structure that sufficiently resembles that of calcium sulphate with or without water of crystallization to ensure crystal growth of the latter on its surface.

Existing processes for the thermal desalination of sea water by distillation in multi-stage flash evaporation plant have the drawback that the product thus obtained is relatively expensive. It would be possible to improve the economic efficiency of the process if the distillation could be performed at higher final temperatures of the brine in the last preheating stages and in the final heater. However, such attempts are defeated by the undesirable formation of boiler scale due to the precipitation of the mineral substances responsible for the hardness of sea water as a result of their negative solubility/temperature characteristics.

Whereas carbonate boiler scale can be prevented or removed by known methods, as yet no satisfactory method of controlling the sulphate type of boiler scale has been more widely adopted in practice, the sulphate scale, once it has formed, being extremely difficult to remove. In the "seeding process" which as such is already known, crystals are introduced into the recirculated brine in the sea water desalination plant, the seed crystals consisting of a finely divided solid calcium sulphate. The Ca-sulphate grains in the hot supersaturated zone of the plant form crystallization nuclei supporting the continued growth of the Ca-sulphate which precipitates from the brine and is thus kept away from the heating surfaces. However, the use of calcium sulphate for seeding has the drawback that the seed readily dissolves at low temperatures and that the seeds which have been added to the sea water or the brine may re-dissolve in colder parts of the plant or when an unscheduled stoppage and consequent cooling occurs.

The large scale application of the present process can be combined with the advantageous possibility of withdrawing the $BaSO_4$ and their charge of calcium sulphate from certain parts of the sea water desalination plant in the form of a sludge and then separated from the adhering calcium sulphate by washing with colder sea water brine. They can then be re-used for seeding. The particular advantage of this proposal resides in that the withdrawal of $BaSO_4/CaSO_4$ sludge from the plant in combination with the continuous withdrawal of part of the concentrated sea water brine perceptibly reduces the Ca-concentration in the brine circulating through the sea water desalination plant. Consequently, the margin between this and the critical Ca-concentration becomes wider, and there is a consequent greater degree of safety from the undesirable formation of sulphate boiler scale. Conversely, there is also a wider margin for a possible further increase in the final temperature of the brine and a consequent improvement in the thermodynamic and economic efficiency of the plant. Calculation shows that the circulating Ca-concentration in a sea water desalination plant falls for instance to 0.8 times its original value if during operation 1/10th of the Ca-content is continuously abstracted in the form of $BaSO_4/CaSO_4$ sludge. Correspondingly the Ca-concentration will fall to 0.69 times the original concentration if 1/5th of the Ca-content is withdrawn continuously as $BaSO_4/CaSO_4$ sludge.

Figure 2:
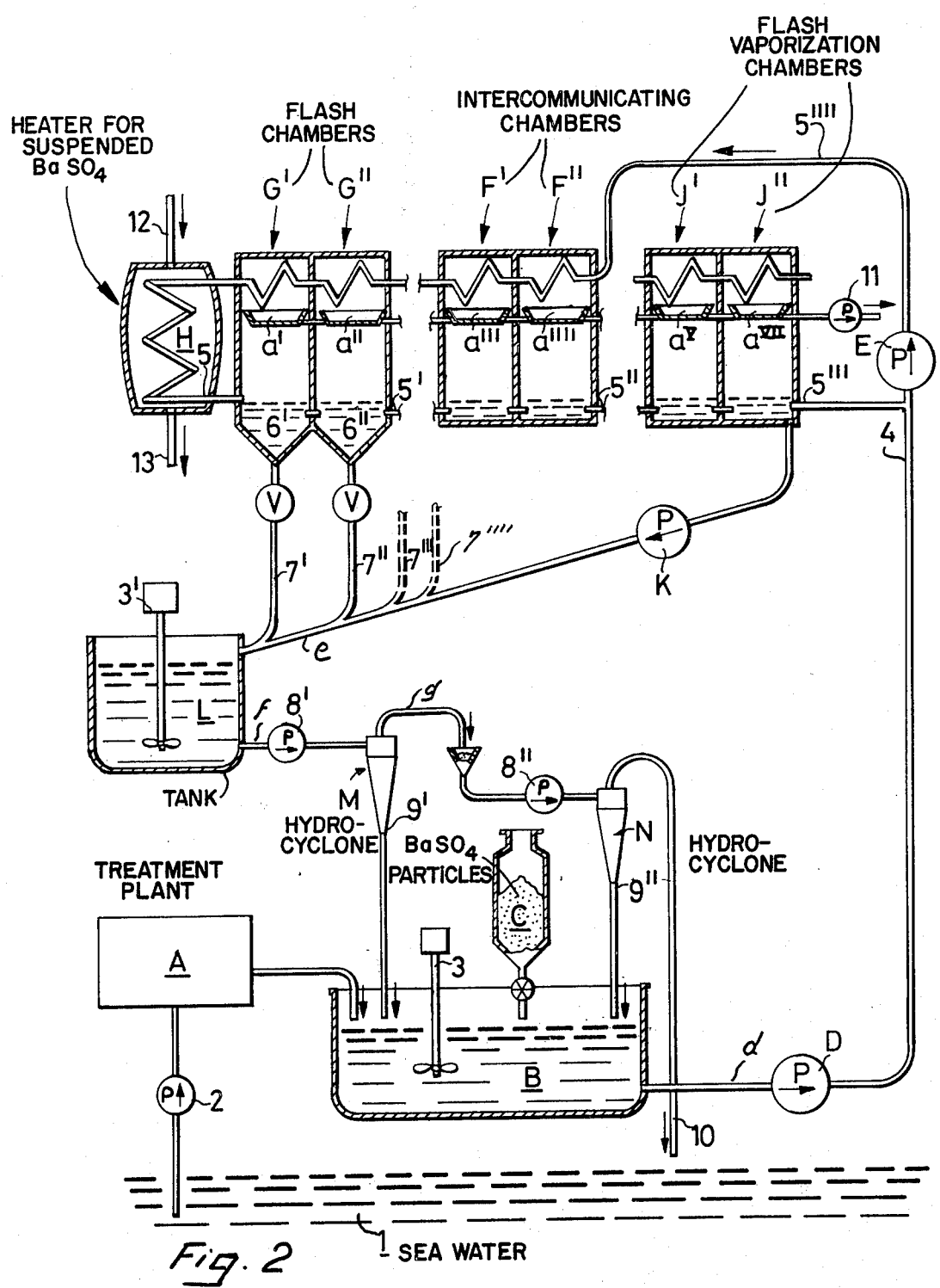

The process according to the invention may be performed in a sea water desalination plant, such as that shown by way of example in FIG. 2 of the drawing. As will be seen from FIG. 2, sea water 1 is by means of a pump 2 pumped into a conventional sea water pretreatment plant A for separation of impurities, elimination or neutralization of the carbonate hardness, for deaeration and other suitable treatment. From the treatment plant A the treated sea water is conveyed to a suspension tank B adapted to receive finely ground barite ($BaSO_4$) from a hopper C. Into the suspension tank B there extends an agitator 3, a discharge pipe 9' of a hydrocyclone M and a discharge pipe 9" of a hydrocyclone N.

The device furthermore comprises a feed pump D which has its suction side through a conduit d in communication with the suspension tank B. The pressure side of feed pump D communicates through a pipe line 4 on one hand with the suction side of a recirculating pump E and on the other hand with a pipe 5''' communicating with the heat rejection part J", J' of a multi-stage flash distillation plant. The pressure side of recirculating pump E communicates with a pipe 5''''' which passes in the form of a condenser tube bundle through flash vaporization chambers F", F' of said multi-stage flash distillation plant in which chambers F", F' the pressure is sub-atmospheric, and furthermore passes through flash vaporization chambers G", G' of said multi-stage flash distillation plant where the pressure is above atmospheric pressure. The pipe 5''''' then passes through a final heater H of the flash distillation plant into the flash vaporization chambers G', G" respectively containing condensate trays a', a". At the bottom portions 6', 6" of the intercommunicating chambers G', G" $BaSO_4/CaSO_4$ sludge accumulates. These bottom portions 6', 6" respectively communicate through V', V" with conduits 7', 7" leading into a pipe e. If desired, there may be provided additional conduits 7''', 7''''. The conduits 7', 7", 7''', 7'''' constitute outlets for $BaSO_4/CaSO_4$ sludge. The pipe e which communicates with the interconnecting chambers J", J' and has a brine withdrawing pump K interposed therein leads into a collecting and washing tank for brine and $BaSO_4$. Into tank L there extends an agitator 3'.

With tank L there communicates a pipe f which has a pump 8' interposed therein and leads to the hydrocyclone M. A conduit g with a funnel h and a pump 8'' interposed therein establishes communication between the cyclones M and N. From the hydrocyclone N there leads a line 10 to the sea water 1 to return thereto reconcentrated sea water brine after the removal of $BaSO_4$.

The intercommunicating chamber F', F" have arranged therein condensate trays $a'''$, $a''''$, and similarly condensate trays $a^V$, $a^{VI}$ are arranged in the intercommunicating chambers J', J". The trays communicate with a distillate withdrawing pump 11. Finally, a pipe 12 for admitting process steams leads into the final heater of the flash distillation plant, while a pipe 13 for removing the condensate leads from the bottom of said final heater of the flash distillation plant.

The process according to the invention will now be described with reference to FIG. 2.

I. From a waterway containing sea water 1, a pump 2 continuously transfers sea water into the preliminary sea water treating plant A (filtration, acidification, deaeration and so forth) which feeds a suspension tank B. Finely powdered barite ($BaSO_4$) from the hopper C is suspended in the sea water with the aid of the agitator 3. The suspension may contain for instance 10 g $BaSO_4$ per liter. Pump D continuously feeds the suspension through pipe 4 into the sea water desalination plant proper which may consist of a plurality of flash vaporization chambers G', G", ..., F", F', J', J".

II. The sea water/$BaSO_4$ suspension is entrained by the recirculating pump E and pumped through banks of condenser tubes in the upper part of the chambers F', F", ..., G", G' in which the suspension becomes gradually hotter. When emerging from G', the temperature of the suspension may be allowed to be above 150°C because the presence of the $BaSO_4$ nuclei prevents the deposition of sulphate scale on the heating surfaces which would otherwise occur. The temperature of the recirculated suspension is raised further in a final heater H. Owing to the scale suppressing action of the $BaSO_4$, final temperatures of for instance 200°C or more can here be obtained. At a point marked 5 the temperature reaches its peak.

III. The hot suspension then re-enters the flash vaporization chamber G' where part of the water evaporates and drips as condensate from the condenser tubes in the upper part of the chamber to be collected in a tray a' as the distillate. Since the velocity of flow of the sea water/BaSO₄ suspension fed into the bottom part of G' is less than the velocity of the suspension flowing through the condenser and final heater tubes, some of the suspended BaSO₄ will settle at the bottom of the chamber at 6' as sludge. This BaSO₄, having passed through the hot condenser and final heater tubes is charged with CaSO₄ (with or without water of crystallization). If the sludge which settles at 6' is discharged intermittently or, if the settling rate is high, continuously, for instance by opening a sludge valve V', then this will remove not only BaSO₄ but also some of the CaSO₄ from the recirculating sea water. The same events repeat themselves in chamber G'' at 6'' and V'' as well as in the other chambers in which the pressure is still above atmospheric and which are fitted with similar sludge removing pipes 7''', . . .

IV. During its travel through the other evaporator chambers of the flash distillation plant, the sea water/BaSO₄ suspension becomes gradually cooler and more concentrated in each stage, so that at points 5', 5'', . . . it is already permissible to refer to sea water brine containing a BaSO₄ addition. In the following chambers of the desalination plant F'', F', J', J'' the pressure is no longer above atmospheric and the removal of sludge by the simple method of opening valves is no longer feasible. If significant quantities of sludge should still settle out, suitable discharge means of the air lock type can be used.

V. From chamber J'' part of the recirculated and concentrated salt brine is withdrawn by pump K and discharged together with the sludge removed through the sludge valves V', V'', etc. . . . into an intermediate tank L in which an agitator 3' again reconstitutes a uniform suspension of sea water brine and BaSO₄, detaching the CaSO₄ from the BaSO₄ to which it adheres, provided this has not already occurred whilst travelling along its path from 7', 7'', 7''', — to L. From the flash vaporization chamber J'' from which part of the brine suspension has been removed by pump K the remainder of the brine suspension is withdrawn by pump E which reintroduces it into the recirculating system 5''''' - 5 - 5' . . . together with the fresh suspension of BaSO₄ in sea water which has been introduced through line 4. The events described at the beginning of the process (starting at II) will therefore now repeat themselves in continuous cycle.

VI. The suspension of sea water brine and BaSO₄ which has been collected in the intermediate tank L and which has released most of the CaSO₄ because of its low temperature is now continuously fed by pump 8' into a hydrocyclone M in which the suspension is separated in a liquid fraction containing substantially no BaSO₄ (overflow) and a solid fraction (BaSO₄, bottom discharge) containing little liquid. The bottom discharge is transferred through 9' into the suspension tank B where it is used to form the fresh BaSO₄ suspension in sea water entering from A. The overflow from the hydrocyclone M may still contain a BaSO₄ charge and it is therefore pumped by a pump 8'' into a second hydrocyclone N which may consist of a group of small hydrocyclones working in parallel to improve the separatory effect. The residual BaSO₄ is thus recovered from the sea water brine and returned through a pipe 9'' to the suspension tank whence the BaSO₄ resumes its journey through the plant as described at the beginning of the description of the process.

VII. The overflow of the cyclone N consists practically entirely of sea water brine. It is re-discharged into the sea at 10. The fresh water (distillate) reclaimed from the sea water in the desalination plant is pumped out of the plant and, possibly after having undergone a final treatment, it is suitable for drinking. For operating the plant process steam is introduced into the final heater H at 12, for instance at a temperature of 200°C. Its condensate is recovered at 13 and returned as feed water to the boiler.

VIII. For the sake of completeness of this description of the process according to the invention for the desalination of sea water it should be noted that the double withdrawal of CaSO₄ from the plant, namely first through 7', 7'', 7''', . . . in the form of BaSO₄/CaSO₄ sludge and again in the course of the withdrawal of brine from chamber J'' by pump K, causes the Ca-content in the recirculated brine (recirculation via E, 5''''', 5, 5', 5'', 5''', . . . ) to decrease constantly until after some time it will remain stationary. This stationary level can be calculated to be about 80% of the original level if at each of the lines 7', 7'', 7''', . . . a total of one tenth of the circulating Ca-content is withdrawn. The stationary final level of the Ca-content will be for instance 69% of the starting level if at each of the lines 7', 7'', 7''', . . . a total of two tenths of the circulating local Ca-content is removed. The time which passes before this equilibrium level is reached, depends upon the technical design details of the sea water desalination plant, but in order of magnitude it will be ten times the average time of recirculation of a unit of volume of brine through the plant.

IX. The above described effect of the proposed desalination process, namely to lower the Ca-content in the recirculated stream has the following result: — either the safety margin from the critical temperature and concentration conditions at which CaSO₄ deposits will form is substantially widened, or the final temperature of the brine or the concentration rate of the plant may be further raised with a view to improving efficiency and the yield of distillate obtained for a given expenditure of power.

It is, of course, to be understood that the present invention is, by no means, limited to the specific showing in the drawings, but also comprises any modifications within the scope of the appended claims.

We claim:

1. In a process for reducing scale deposition in a distillation apparatus used for distilling sea water, the improvement comprising adding barium sulphate in the form of finely divided particles in suspension to said sea water, maintaining said sea water continuously in motion, thereby maintaining said particles in constant suspension in said sea water, and heating said sea water with said barium sulphate particles in suspension to a temperature at which the calcium sulphate present in said sea water is supersaturated, said particles acting as precipitation nuclei for said calcium sulphate initially present in said sea water.

2. A process according to claim 1, in which said barium sulphate is suspended in cold water metered into said process.

3. A process according to claim 1, in which the barium sulphate grains carrying calcium sulphate are recovered from the process and cooled and separated from said calcium sulphate which has attached itself to said barium sulphate grains, and the recovered barium sulphate is returned to said process for renewed inoculation.

4. A process according to claim 1, in which finely milled barite ($BaSO_4$) is added to the sea water entering the process.

5. A process according to claim 4, in which said barite is added to the sea water at a ratio of 10 grams per one liter of sea water or brine.

6. A process according to claim 4, in which the grain size of said barite is from 10 to 150 microns.

7. A process according to claim 4, in which the finely milled barite in the form of a suspension is entrained by the sea water and the circulating brine and employed as crystallization seed in the immediate vicinity of heating surfaces.

8. A process according to claim 7, which includes the steps of allowing the suspended barite partly loaded with crystallized $CaSO_4$ to settle as a sludge in those parts of the plant where the flow velocity of the brine carrying suspended barite is relatively slow.

9. A process according to claim 8, which includes the step of discharging at regular intervals the $BaSO_4$-$CaSO_4$ sludge which settles in the first chambers of the flash evaporation plant, which chambers are operated at above atmospheric pressure.

10. A process according to claim 8, which includes the step of continuously discharging the $BaSO_4/CaSO_4$ sludge which settles in the first chambers of the flash evaporation plant, which chambers are operated at above atmospheric pressure.

11. A process according to claim 8, which includes removing the $BaSO_4/CaSO_4$ sludge from the flash evaporation chambers operating at above atmospheric pressure, entraining the thus removed sludge in the sea water brine withdrawn from colder parts of said flash evaporization plant and transporting said sludge to a tank, the Ca respectively $CaSO_4$ on the $BaSO_4$ redissolving during its transportation and its cooling down after entering the tank.

12. A process according to claim 11, which includes separating the substance in said tank into a liquid and a predominantly solid fraction.

13. A process according to claim 12, which includes returning the liquid fraction (brine having a raised content of Ca) to the sea, and collecting the fraction which is in a state between a sludge and a solid (fine grained $BaSO_4$ without attached $CaSO_4$), suspending it in unused sea water and recycling it into the process for seeding.

14. A process according to claim 10, which includes the step of concurrently withdrawing from 1/10 to 2/10 of the Ca circulating in said process.

15. The process claimed in claim 1, said process including moving said sea water with barium sulphate in suspension along heated metal surfaces to heat said water to a temperature to distill off water, said calcium sulphate precipitating out collecting on said barium sulphate particles instead of on said metal surfaces.

16. In a process for reducing scale deposition in a distillation apparatus for distilling sea water, the improvement comprising adding barium sulphate in the form of finely divided particles in suspension to said sea water, maintaining said sea water continuously in motion, thereby maintaining said particles in constant suspension in said sea water, and heating said sea water with said barium sulphate particles in suspension to a temperature at which the calcium sulphate present in said sea water is supersaturated, said particles acting as precipitation nuclei for said calcium sulphate initially present in said sea water, removing sludge formed of said barium sulphate and calcium sulphate, dissolving out said calcium sulphate in cold water, and separating said barium sulphate and returning it to fresh sea water to continue the separation of calcium sulphate.

17. In a process for reducing scale deposition in a distillation apparatus used for distilling sea water, including subjecting the sea water to a pretreatment comprising filtering, acidifying and degassing said sea water, the improvement comprising adding barium sulphate in the form of finely divided particles in suspension to said sea water, maintaining said sea water continuously in motion, thereby maintaining said particles in constant suspension in said sea water, and heating said sea water with said barium sulphate particles in suspension in a continuous multi-stage flash evaporator to a temperature to distill off part of the water and at which temperature the calcium sulphate present in said sea water is supersaturated, said particles acting as precipitation nuclei for said calcium sulphate initially present in said sea water, and collecting the evaporated portion of said water as condensate and distillate.

18. A process according to claim 1, in which said sea water with barium sulphate particles in suspension is heated to a temperature to distill off water and to precipitate the calcium sulphate present in said sea water.

* * * * *